(12) United States Patent
Andersen

(10) Patent No.: US 6,459,828 B1
(45) Date of Patent: Oct. 1, 2002

(54) REARRANGEABLE OPTICAL ADD/DROP MULTIPLEXOR SWITCH WITH LOW LOSS

(75) Inventor: David Andersen, Sunnyvale, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/561,769

(22) Filed: Apr. 29, 2000

(51) Int. Cl.⁷ .................................................. G02B 6/26
(52) U.S. Cl. .............................. 385/17; 385/18; 385/16
(58) Field of Search .............................. 385/17, 18, 16, 385/19, 20, 47

(56) References Cited

U.S. PATENT DOCUMENTS 5,699,462 A * 12/1997 Fouquent et al. ............. 385/18
6,144,781 A * 11/2000 Goldstein et al. ............ 385/16
6,208,778 B1 * 3/2001 Donald ........................ 385/17

* cited by examiner

Primary Examiner—Cassandra Spyrou
Assistant Examiner—Fayez Assaf
(74) Attorney, Agent, or Firm—Pamela Lau Kee

(57) ABSTRACT

An optical switch array has row and column waveguide segments, on a waveguide substrate. Each waveguide segment terminates in a trench positioned in one of two patterns. In the first pattern, the trenches are positioned along the diagonal while in the second pattern, the trenches are positioned in a regular array. The row and column waveguide segments are in fixed relation and generally parallel to the surface of the waveguide substrate. A heater substrate has heaters aligned to the waveguide substrate in accordance with the trenches. A liquid, disposable within the trenches, is responsive to the heaters. The liquid has an index of refraction such that optical transmission from a first selected waveguide segment to a second waveguide segment is determined by presence of the liquid within the trenches.

7 Claims, 4 Drawing Sheets

REARRANGEABLE OPTICAL ADD/DROP MULTIPLEXOR SWITCH WITH LOW LOSS

FIELD OF THE INVENTION

The present invention generally relates to optical switching arrangements and more particularly, to arrangements of optical switching units for selectively manipulating optical signals from input and add ports to output and drop ports.

BACKGROUND

Traditionally, signals within telecommunications and data communications networks have been exchanged by sending electrical signals via electrically conductive lines. An alternate mode of data exchange is the transmission of optical signals through optical fibers. Information is exchanged in the form of modulations of laser-produced light. Although the equipment for efficient generation and transmission of the optical signals is available, the design of optical switches for use in telecommunications and data communications networks is problematic. As a result, switching requirements within an optical network may be met by converting the optical signals to electrical signals at the inputs of a switching network, and then reconverting the electrical signals to optical signals at the outputs of the switching network.

One prior art switching matrix is an ADD/DROP multiplexor switch that includes ADD and DROP ports in addition to the input and output ports. The multiplexor switches are used in telecommunications applications in which signals are passed through a series of nodes. Each node can introduce additional signals and is able to extract those signals that identify that node as a target. For example, each node may be a switching facility of a long distance carrier that supports calls to and from a number of cities. Calls that originate in a city are introduced using ADD ports within the switching facility of that city. Alternatively, data and voice information for calls directed to a telephone supported by that switching facility are extracted via DROP ports. A known switching arrangement 42 that can be used as a rearrangeable ADD/DROP switch is shown in FIG. 1. The arrangement includes a 4×4 matrix of optical switching units for selectively coupling any one of four input ports 44, 46, 48 and 50 to any one of four output ports 52,54,56 and 58. In FIG. 1, switching units 60,62,64, 66, are in a reflective state that is shown as having a bubble at the area of the intersection of input and output waveguides to that switching unit. The remaining twelve switching units are in the transmissive state, since there are no bubbles present at the intersections of the input and output waveguides to those switching units.

Optical fibers are connected to each of the input ports 44–50 and each of the output ports 52–58. An optical signal introduced at the input port 44 is reflected at the switching unit 62 and output via the output port 54. Similarly, an optical signal from the input port 46 will reflect at the switching unit 64 for output at the port 56. An optical signal from input port 48 reflects at the switching unit 66 for output via the port 58. Finally, an optical signal on port 50 is reflected to output port 52 by the switching unit 60. By selective manipulation of the bubbles within the various trenches, any one of the input ports can be connected to any one of the output ports.

The arrangement 42 includes four ADD ports 68,70,72 and 74. Each ADD port is uniquely associated with one of the output ports 52–58, since an optical signal that is introduced at one of the ADD ports can be directed only to its aligned output port. Thus, an optical signal on add port 68 can be directed to the output port 52 by changing the switching unit 60 to the transmissive state. This change to the transmissive state places the input port 50 in optical communication with a drop port 76. As the DROP port 76 maps only to the input port 50, the DROP port cannot be optically coupled to any other input or ADD port. Similarly, each one of three other drop ports 78, 80 and 82 uniquely maps with the input ports 44,46 and 48, respectively, with which the DROP port is linearly aligned.

There is limited flexibility with regard to introducing and extracting signals with the optical arrangement 42 of FIG. 1. What is needed is an optical switching arrangement with a high degree of flexibility with respect to channeling optical signals from input ports to drop ports and from add ports to output ports.

SUMMARY OF THE INVENTION

An optical ADD/DROP multiplexor switch has row and column waveguide segments, on a waveguide substrate, with ends that intersect trenches positioned in one of two patterns. In the first pattern, the trenches are positioned along the diagonal while in the second pattern, the trenches are positioned in a regular array. The row and column waveguide segments are in fixed relation and generally parallel to the surface of the waveguide substrate. A heater substrate has heaters aligned to the waveguide substrate in accordance with the trenches. A liquid, disposable within the trenches, is responsive to the heaters. The liquid has an index of refraction such that optical transmission from a first selected waveguide segment to a second waveguide segment is determined by presence of the liquid within the trenches.

This configuration of the optical ADD/DROP multiplexor switch allows complete rearrangement of IN ports to DROP ports and ADD ports to OUT ports. The multiplexor switches may be cascaded such that the number of input and output ports may be increased while the number of switched ADD and DROP fibers are constant.

DETAILED DESCRIPTION OF THE DRAWINGS

Figure 1:
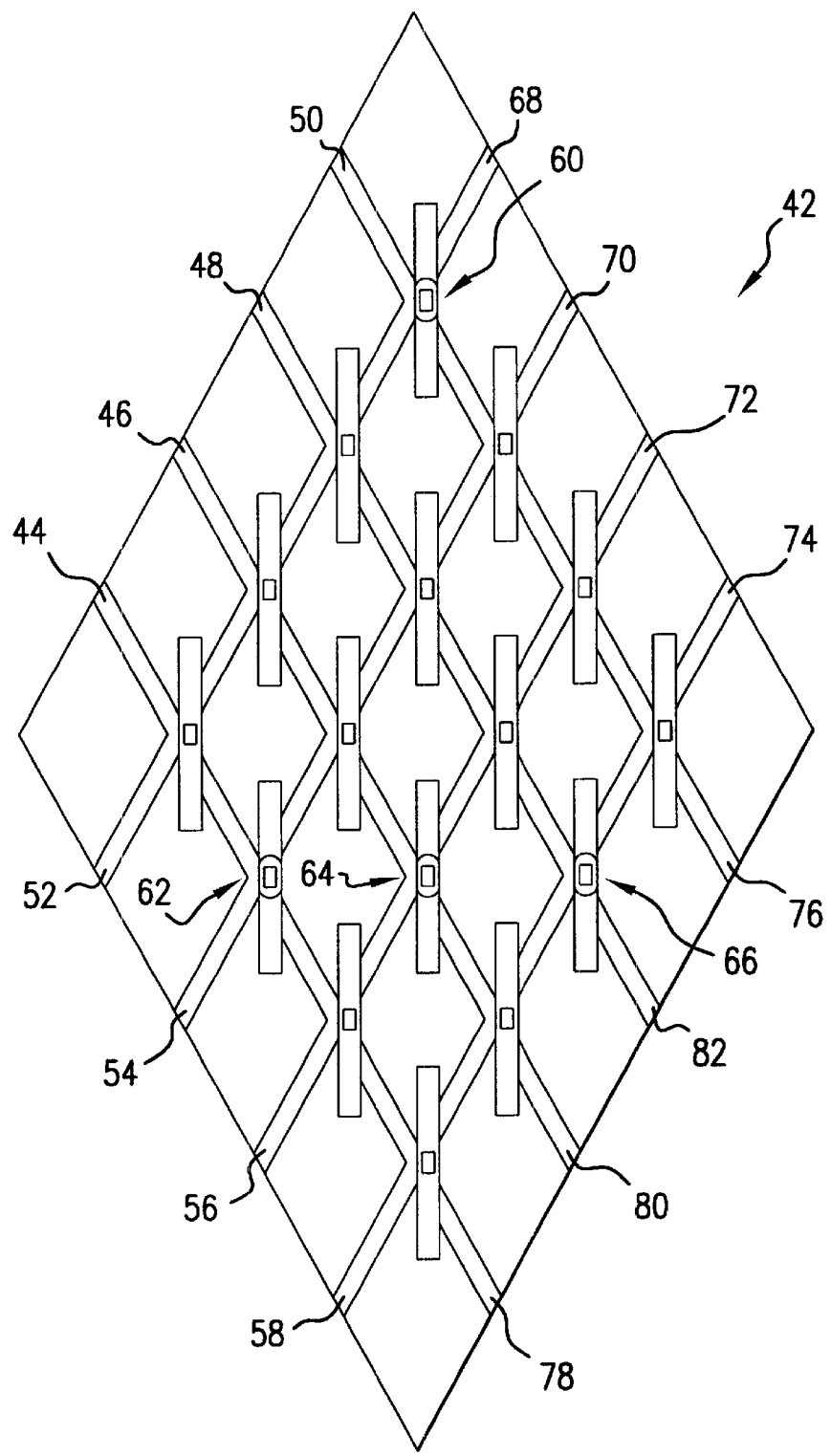
FIG. 1 shows a switching matrix of the prior art.

The optical ADD/DROP multiplexor switch of the present invention has minimized loss on the IN to OUT paths and has flexibility for rearrangeably adding and dropping signals. Although the invention may be applied to any optical switching unit, the illustrative embodiment uses the optical switching element disclosed by Fouquet, et al. in U.S. Pat. No. 5, 699,462, shown in FIG. 2. Alternate optical switching elements include moving mirrors, silicon optical switches and thermo-optics switches. In all these embodiments, the optical switching element is placed at the intersection of the light paths.

The switching unit of Fouquet, et al. includes planar waveguides that are formed by layers on a substrate. The waveguide layers include a lower cladding layer 14, an optical core 16, and an upper cladding layer, not shown. The optical core is primarily silicon dioxide combined with other materials to achieve a desired index of refraction. The cladding layers are formed of a material having a refractive index that is different than the refractive index of the core material, so that optical signals are guided along the core.

The layer of core material 16 is patterned into waveguide segments that define a first input waveguide 20 and a first output waveguide 26 of a first optical path and define a second input waveguide 24 with a second output waveguide 22 of a second optical path. The upper cladding layer is then deposited over the patterned core material. A gap is formed by etching a trench 28 through the core material and the two cladding layers 14 to the substrate. The first input waveguide 20 and the second output waveguide 22 intersect a sidewall of the trench 28 at an angle of incidence greater than the critical angle of total internal reflection (TIR) when the crosspoint 30 of the waveguides is filled with a vapor or gas. Thus, TIR diverts light from the input waveguide 20 to the output waveguide 22, unless an index-matching fluid resides within the crosspoint 30 between the aligned input and output waveguides 20 and 26. The trench 28 is positioned with respect to the four waveguides such that one sidewall of the trench passes through or is slightly offset from the intersection of the axes of the waveguides.

Figure 2:
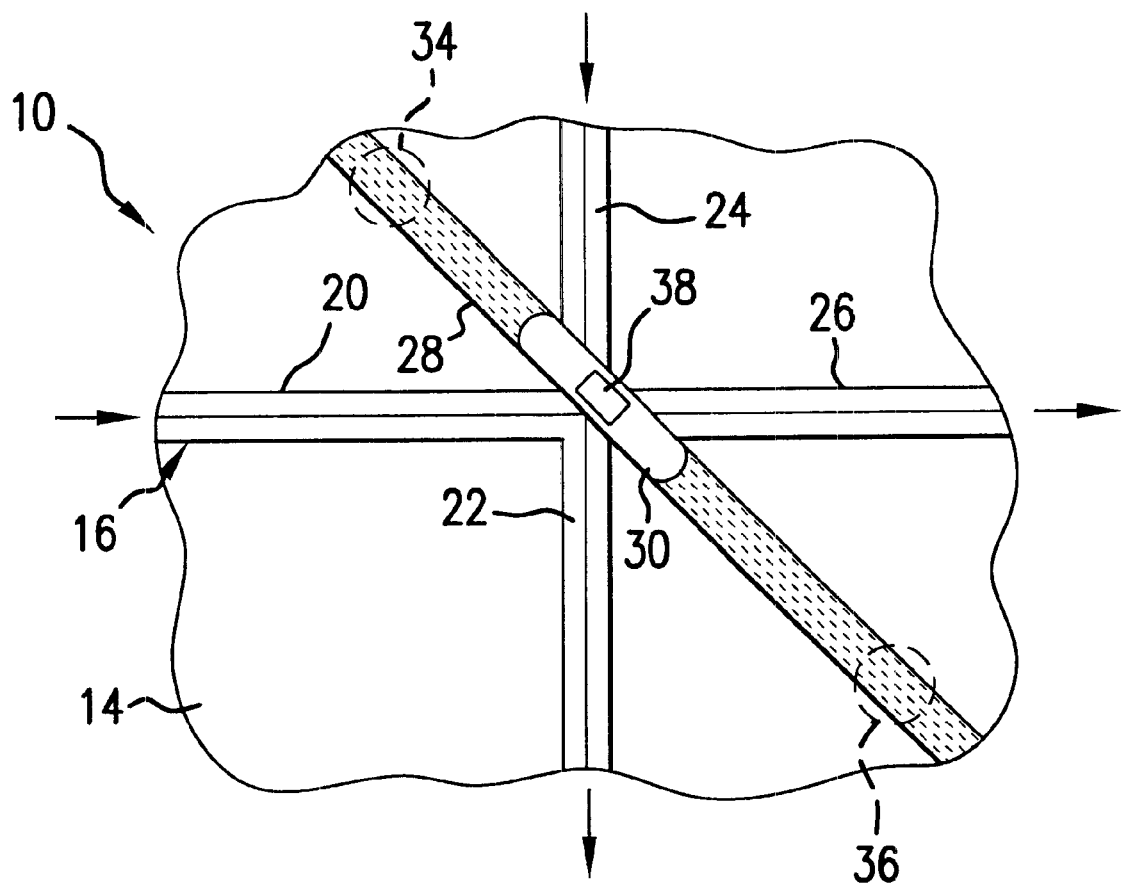
FIG. 2 shows a prior art optical switch.

The above-identified patent to Fouquet et al. describes a number of alternative approaches to switching the optical switching unit 10 between a transmissive state and a reflective state. One approach is illustrated in FIG. 2. The switching unit 10 includes a microheater 38 that controls formation of a bubble within the fluid-containing trench. While not shown in FIG. 2, the waveguides of a switching matrix are typically formed on a waveguide substrate and the heaters and heater control circuitry are integrated onto a heater substrate that is bonded to the waveguide substrate. The fluid within the trench has a refractive index that is close to the refractive index of the core material 16 of the four waveguides 20–26. Fluid fill-holes 34 and 36 may be used to provide a steady supply of fluid, but this is not critical. In the operation of the switching unit, the heater 38 is brought to a temperature sufficiently high to form a bubble. Once formed, the bubble can be maintained in position by maintaining power to the heater. In FIG. 2, the bubble is positioned at the crosspoint 30 of the four waveguides. Consequently, an input signal along the waveguide 20 will encounter a refractive index mismatch upon reaching the sidewall of the trench 28. This places the switching unit in a reflective state, causing the optical signal along the waveguide 20 to be redirected to the second output waveguide 22. However, even in the reflective state, the second input waveguide 24 is not in communication with the first output waveguide 26.

If the heater 38 at crosspoint 30 is deactivated, the bubble will quickly condense and disappear. This allows index-matching fluid to fill the crosspoint 30 of the waveguides 20–26. The switching unit 10 is then in the transmissive state, since input signals will not encounter a significant change in refractive index at the interfaces of the input waveguides 20 and 24 with the trench 28. In the transmissive state, the optical signals along the first input waveguide 20 will propagate through the trench to the first output waveguide 26, while optical signals that are introduced via the second input waveguide 24 will propagate through the trench to the second output waveguide 22.

Figure 3:
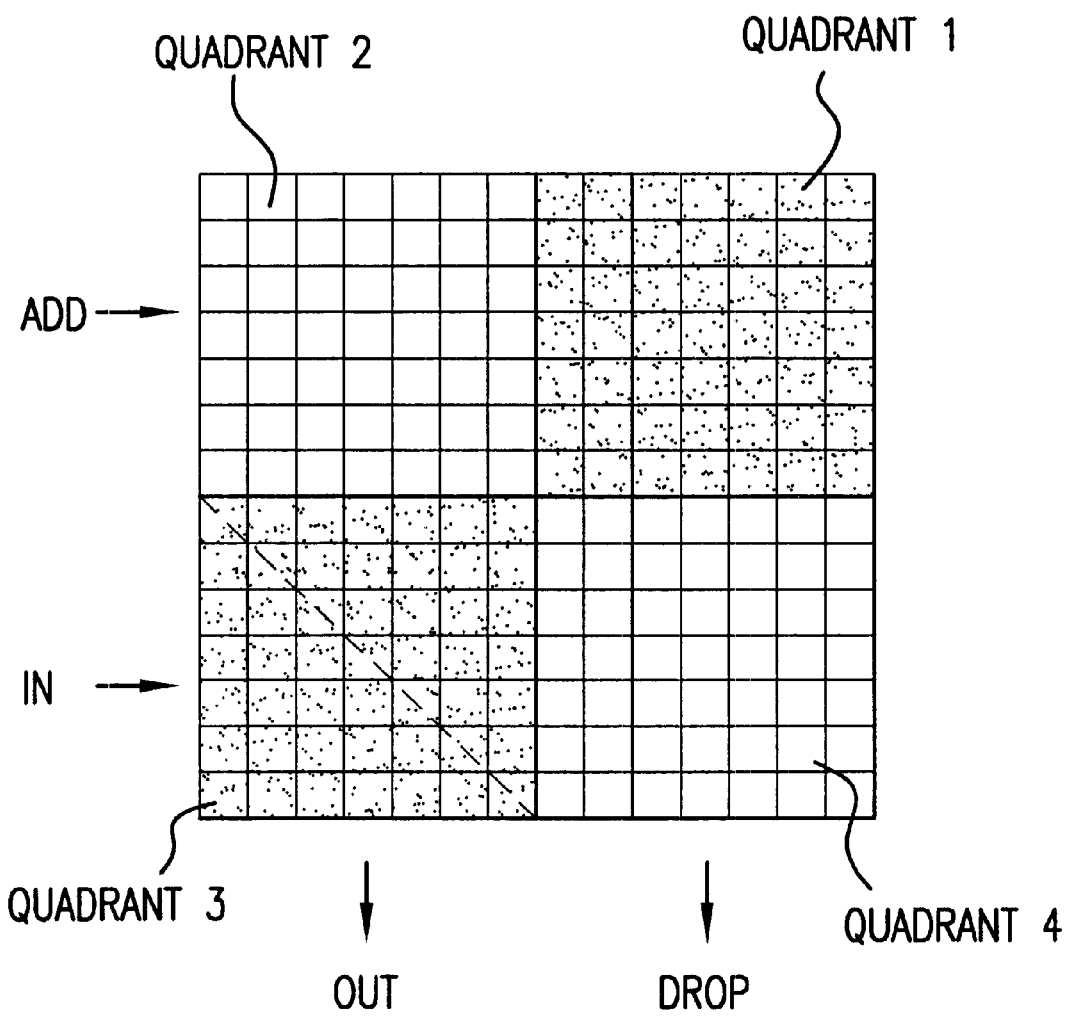
FIG. 3 illustrates an optical ADD/DROP multiplexor switch of the present invention.

The optical ADD/DROP multiplexor switch of the present invention, shown in FIG. 3, includes a waveguide substrate that has four quadrants. On the waveguide substrate, there are row and column waveguide segments having ends that intersect trenches positioned in one of two matrix patterns. Each waveguide intersection that includes a trench forms a switching unit. A heater substrate has heaters aligned to the waveguide substrate according to the trench pattern. A liquid, having an index of refraction equal to the index of refraction of the waveguide core, is placed within the trenches. The switching is determined by presence (TRANSMISSION state) or absence (REFLECTIVE state) of the liquid within the trenches.

Quadrant 1, the upper right quadrant, has no trenches. Without trenches, there is no switching in the waveguides. Any light entering a waveguide exits on the same waveguide with minimum loss. The loss due to trench crossing is zero.

Quadrant 2 has a trench at each intersection of row and column waveguide segments. When one of the trenches is filled with an index of refraction matching fluid, light passes across the trench with minimum loss. When the corresponding heater for thermally actuating an isolated change in the index of refraction, e.g. bubble, in the fluid is actuated, incoming (ADD) light is redirected to a selected exiting (OUT) fiber. This arrangement allows any idle input to be switched to any idle output without rearrangement of other connections.

Quadrant 3 has trenches along the intersection of the top left to lower right diagonal. This allows a signal on a given IN fiber to be passed directly to Quadrant 4 during the TRANSMISSION state or switched to one specific OUT fiber during the REFLECTIVE state. Since there are no trench losses when the signal is switched this creates a very low loss IN to OUT path. In addition, the sparse trench density in this quadrant minimizes the losses on signals passed down from Quadrant 2 or passed on to Quadrant 4.

Quadrant 4 has a trench pattern identical to Quadrant 2. Any signal entering from Quadrant 3 can be switched to any DROP fiber. If the signal is not switched to a DROP fiber, it passes directly through the quadrant and is terminated.

Figure 4:
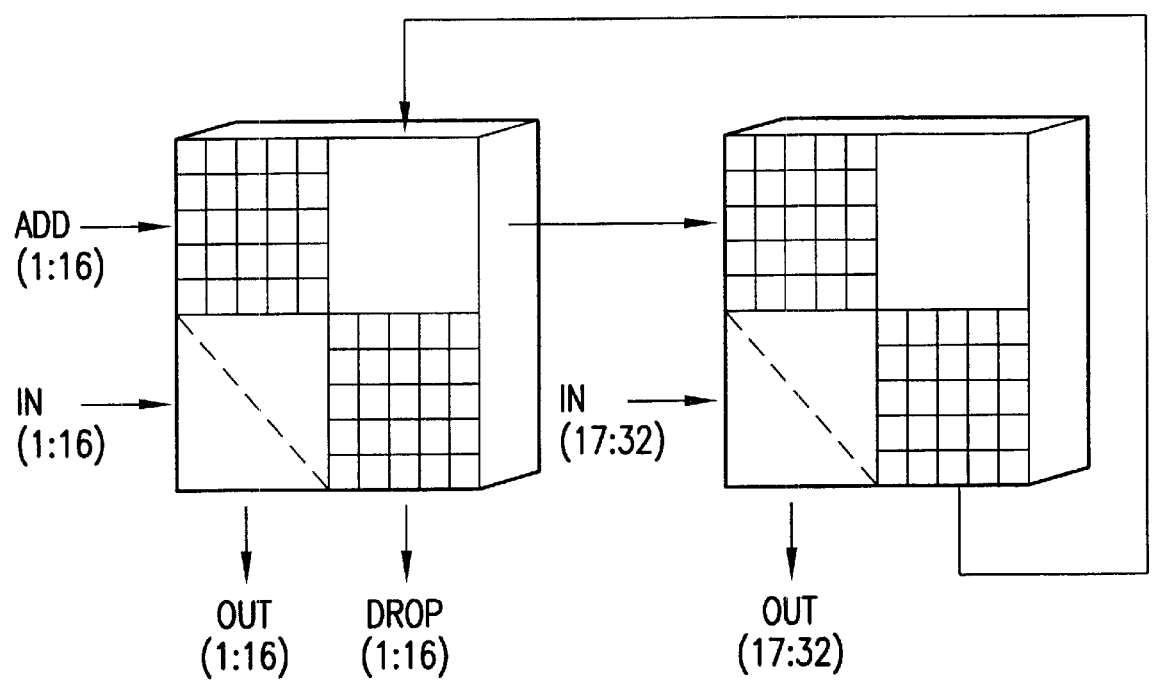
FIG. 4 illustrates an embodiment for cascading the multiplexor switches shown in FIG. 3.

The number of IN paths must equal the number of OUT paths. There may be any number of ADD and DROP paths up to and including the number of IN and OUT paths. The total number of IN/OUT paths may be increased by cascading arrays as shown in FIG. 4. This arrangement does not change the number of ADD or DROP paths.

I claim:

1. An optical ADD/DROP multiplexor switch comprising:
    a waveguide substrate, having four quadrants, each quadrant having row optical paths and column optical paths, wherein quadrant 2 has ADD ports, quadrant 3 has IN and OUT ports, and quadrant 4 has DROP ports; and
    a plurality of optical switching elements disposed in quadrants 2, 3 and 4, the optical switching elements of quadrant 3 being disposed at selected intersections of the row and column optical paths in a first matrix pattern, the optical switching elements of quadrant 2 and 4 being disposed at selected intersections of the row and column optical paths in a second matrix pattern.

2. An optical ADD/DROP multiplexor switch, as defined in claim 1, the optical switching elements being selected from a group that includes moving mirrors, silicon optical amplifiers, and thermo-optic switches.

3. An optical ADD/DROP multiplexor switch, as defined in claim 1, the plurality of optical switching elements comprising:
    a heater substrate, having heaters disposed at the intersections of the row and column optical paths; and
    a liquid, disposable within the optical paths, being responsive to the heaters, having an index of refraction such that optical transmission from a first selected one of the row and column optical paths to a second selected one of the row and column paths is determined by change in the index of refraction of the liquid within the optical paths.

4. An optical ADD/DROP multiplexor switch, as defined in claim 1, wherein the optical switching elements in the first matrix pattern are disposed at the intersections along the diagonal of the first matrix pattern, there being no optical switching elements disposed at the other intersections of the row and column optical paths.

5. An optical ADD/DROP multiplexor switch, as defined in claim 1, wherein the optical switching elements in the second matrix pattern are disposed at each intersection of each row and column optical paths.

6. The optical ADD/DROP multiplexor switch of claim 1, wherein there are no optical switching elements in quadrant 1.

7. An assembly of optical ADD/DROP multiplexor switches, comprising:

a first multiplexor switch comprising:

a waveguide substrate, having four quadrants, wherein quadrant 2 has ADD ports, quadrant 3 has IN and OUT ports, and quadrant 4 has DROP ports; and a plurality of optical switching elements positioned in quadrants 2, 3 and 4, for each quadrant, the optical switching elements being positioned at each intersection of the row and column optical paths in one of a first and second matrix pattern; and a second optical ADD/DROP multiplexor switch comprising:

a waveguide substrate, having four quadrants, wherein quadrant 2 has ADD ports, quadrant 3 has IN and OUT ports, and quadrant 4 has DROP ports; and a plurality of optical switching elements positioned in quadrants 2, 3 and 4, for each quadrant, the optical switching elements being positioned at each intersection of the row and column optical paths in one of a first and second matrix pattern; and wherein the ADD ports of the second optical ADD/DROP multiplexor switch are connected to quadrant 1 of the first optical ADD/DROP multiplexor switch, the DROP ports of the second optical ADD/DROP multiplexor switch being connected to quadrant 1 of the first optical ADD/DROP multiplexor switch.

\* \* \* \* \*